(12) United States Patent
Krovitz et al.

(10) Patent No.: US 7,941,429 B2
(45) Date of Patent: May 10, 2011

(54) INTERFACE FOR VISUALLY SEARCHING AND NAVIGATING OBJECTS

(75) Inventors: David Krovitz, Calabasas, CA (US); Shay McCloskey, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 386 days.

(21) Appl. No.: 11/827,316

(22) Filed: Jul. 10, 2007

(65) Prior Publication Data
US 2009/0019031 A1 Jan. 15, 2009

(51) Int. Cl.
G06F 7/00 (2006.01)
G06F 17/30 (2006.01)
(52) U.S. Cl. ........................................ 707/723; 715/763
(58) Field of Classification Search .......................... None
See application file for complete search history.

(56) References Cited

U.S. PATENT DOCUMENTS

| | | | |
|---|---|---|---|
| 6,331,861 B1 * | 12/2001 | Gever et al. | 345/629 |
| 2005/0168488 A1 * | 8/2005 | Montague | 345/659 |
| 2008/0059352 A1 * | 3/2008 | Chandran | 705/35 |

OTHER PUBLICATIONS

Anonymous. (2007). "Google Image Search-cat," located at <http://images.google.com/images?sourceid=navclient&ie=UTF-8&rls=EGLC,EGLC:200...>, last visited on Nov. 28, 2007, two pages.

* cited by examiner

Primary Examiner — Uyen T. Le
(74) Attorney, Agent, or Firm — James J. DeCarlo; Greenberg Traurig, LLP

(57) ABSTRACT

Interfaces, apparatuses, and methods for searching and navigating a set of objects are provided. In one example, an interface includes a field for entering filter criteria for searching a set of objects and a display portion for displaying tiles associated with the objects according to the filter criteria. The tiles are displayed such that the best match to the filter criteria is displayed centrally and/or larger relative to other displayed tiles within the display portion. For example, the set of objects may be ranked according to the filter criteria by a suitable algorithm to determine the object having the highest rank or best match to the filter criteria. Further, tiles associated with lower ranked objects may be displayed concentrically around the best match such that the display centers on the tiles associated with the highest ranked objects per the filter criteria.

20 Claims, 8 Drawing Sheets

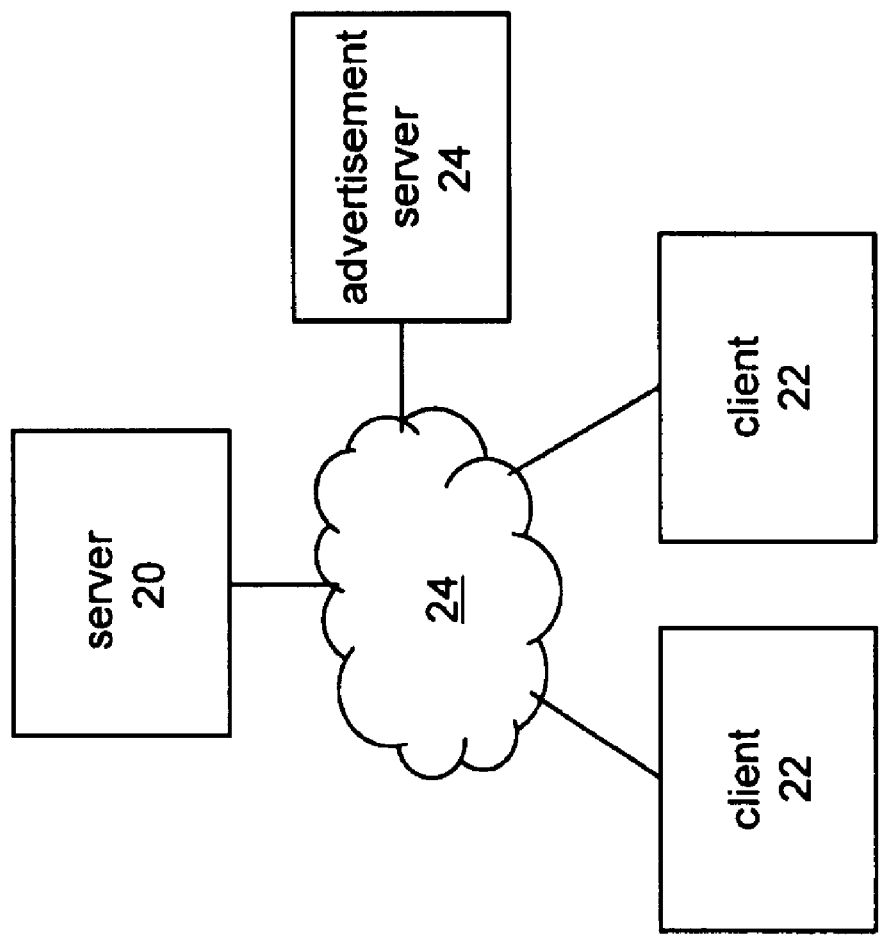

FIG. 3C

INTERFACE FOR VISUALLY SEARCHING AND NAVIGATING OBJECTS

BACKGROUND

1. Field

The present invention relates generally to systems and methods for user interfaces, and in one example, to a user interface for visually searching and navigating an inventory of objects.

2. Related Art

The Internet and other networks interconnect computers and computing devices to allow for easy transport of data over network connections. Commonly, computers and computing devices are organized using well-known client-server models, wherein network connections are established between some computers or computing devices that act as servers and some computers or computing devices that act as clients. An example of a server is a web server and an example of a client is a web client such as a personal computer device running a web browser program. Generally, a web client operates according to the interface to issue requests to web servers, using well-known (or other suitable) protocols. In response to requests received, web servers return data responses. In a typical web client-server interaction, HTTP protocol is used, wherein the web client issues a request directed at a particular web server address for a page represented by a URL in the request and a server responsive to the particular web server address responds with data that may be a page to be displayed or other data set. Generally, regardless of the actual data being requested and returned, the data returned is referred to as a web page.

Web pages often include interfaces for searching inventories of objects; for example, a set of objects available from a particular source or sources. A web interface might search for web pages, media objects (e.g., image files, video files, audio files, and so on), products, and so on. Typically a user may enter search criteria (such as keywords or attributes) and the server returns search results, generally by generating a top-down relevancy order based on the search criteria and a particular searching algorithm. The search results displayed as a list according to the relevance order beginning with the best match listed first.

BRIEF SUMMARY

According to some aspects of the inventions provided herein, interfaces, apparatuses, and methods are provided for searching and navigating objects. In one example described herein, an interface includes a field for entering filter criteria for searching a set of objects and a display window for displaying tiles associated with the objects according to the filter criteria. The tiles are displayed such that the best match to the filter criteria is displayed centrally and/or larger relative to other displayed tiles within the display window. For example, the set of objects may be ranked according to the filter criteria by a suitable algorithm to determine the object having the highest rank or best match to the filter criteria, as well as the relative positioning of other tiles (e.g., tiles associated with objects ranked according to the filter criteria). In one example, tiles associated with lower ranked objects are displayed concentrically around the best match such that the display centers on the tiles associated with the highest ranked objects per the filter criteria.

The tiles may include an image and/or text associated with the object. The tiles may further include multiple display states and may be selectable to access additional information or content associated with the object. Further, the display of tiles may be navigated similar to conventional map application, e.g., whereby a user may pan or zoom in-and-out (e.g., to display fewer or more tiles).

In another aspect, apparatus is provided for causing the display of a search interface. In one example the apparatus includes logic for receiving filter criteria for filtering a set of objects, and logic for causing the display of a plurality of tiles associated with the set of objects, the tiles displayed based on a ranking of at least a portion of the set of objects according to the filter criteria, wherein a tile associated with the highest ranking object is displayed centrally relative to other tiles. The apparatus may further include logic for determining a ranking of at least a portion of the set of objects based on the filter criteria.

In another aspect of the present invention, a method is provided for searching objects. In one example, the method includes receiving filter criteria for searching a set of objects, ranking at least a portion of the objects based on the filter criteria, and displaying tiles associated with the at least a portion of the objects based on the ranking, wherein an image associated with the highest ranked object is displayed centrally relative to other displayed tiles.

According to another aspect of the present invention, a computer-readable medium encoded with computer program instructions for searching a set of objects is provided. In one example, the computer program instructions include program code for receiving filter criteria for filtering a set of objects, and program code for causing a display of a plurality of tiles associated with the set of objects, the tiles displayed based on a ranking of at least a portion of the set of objects according to the filter criteria, wherein a tile associated with the highest ranking object is displayed centrally relative to other tiles.

The various aspects and examples of the present inventions are better understood upon consideration of the detailed description below in conjunction with the accompanying drawings and claims.

BRIEF DESCRIPTION OF THE DRAWINGS

FIG. 1 illustrates an exemplary environment in which some aspects and examples described herein are used;

FIGS. 3A-3C illustrate an exemplary interface according to another example;

DETAILED DESCRIPTION

Figure 2A:
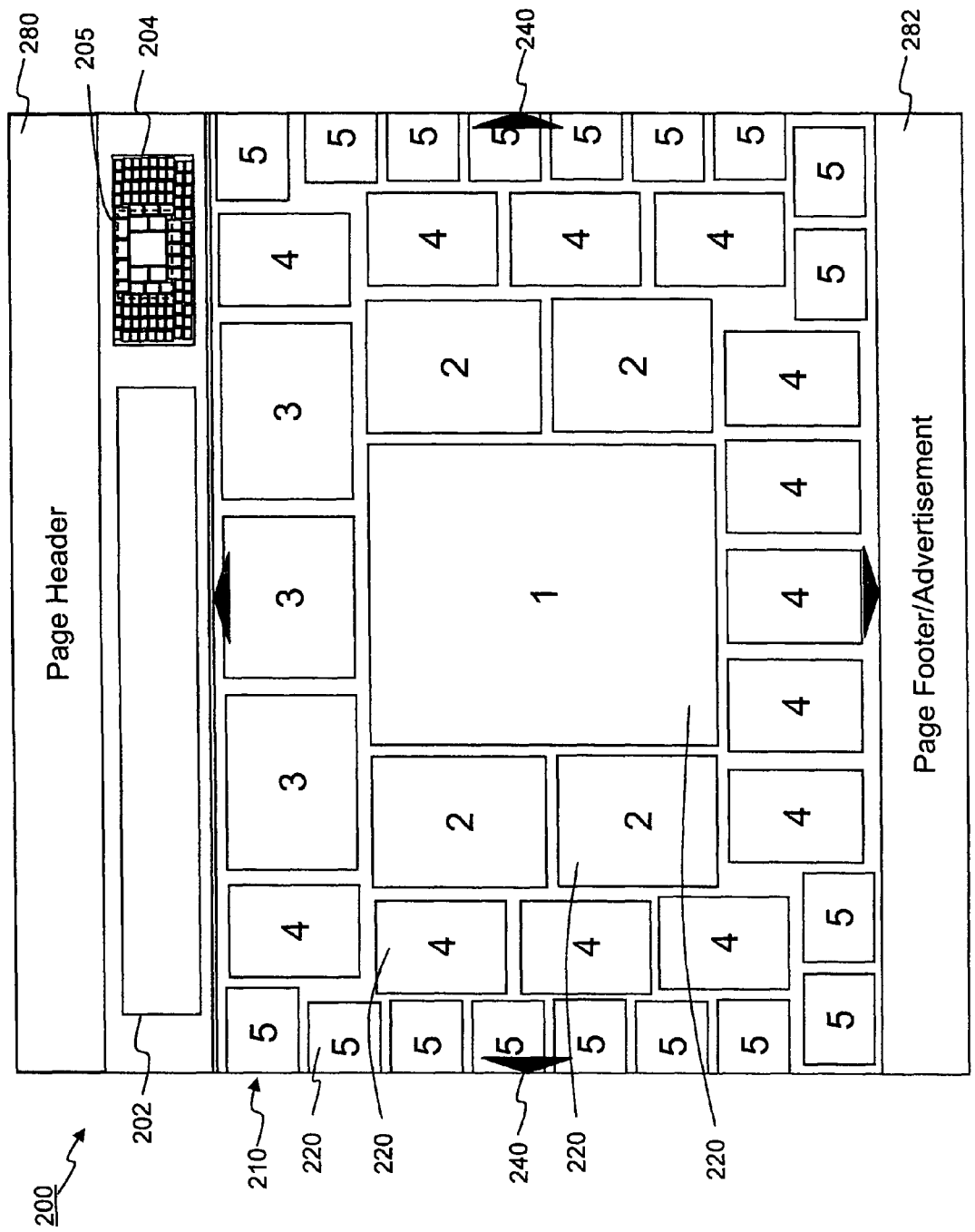
FIGS. 2A and 2B illustrate an exemplary interface according to one example.

The following description is presented to enable a person of ordinary skill in the art to make and use the inventions. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the inventions. Thus, the present inventions are not intended to be limited to the examples described herein and shown, but are to be accorded the scope consistent with the claims.

In one aspect and example described herein, an exemplary search interface displays search results in a visual manner around a central point with the highest ranked result (e.g., the best match based on entered search filter criteria) positioned at the center and lower ranked results positioned therearound. For example, for an inventory of objects (which may include hundreds, thousands, millions, or more potential search results), filter criteria may be entered by a user, which may include text keywords, attribute selections, and so on to return a result set of objects according to the filter criteria. In one example for searching an inventory of related objects such as automobiles, sinks, characters, personal ads, real estate listings, and so on, the objects may be described with a small set of shared attributes. The attributes may be selected and varied by a user to filter and rank the inventory of objects. The best match to the filter criteria may be displayed centered in a display window and displayed larger than other lower ranked objects.

The interface may further allow a user to navigate the display of search results (or result set) similar to a map application (e.g., having functions such as pan, zoom in and out, drag page contents, etc. to navigate the display of results). The interface may display the results in a non-paginated manner, e.g., the user may use a map-type view to see all or a large set of the search results. The exemplary visual interface described creates both a visual and list view of the inventory, centering the display on the most popular or highest ranked object according to the filter criteria (e.g., search terms or selected attributes).

Initially, and with reference to FIG. 1, an exemplary environment in which certain aspects and examples of the user interface, apparatus, and methods described may operate. Generally, one or more clients 22 may access a server 20, which includes logic for causing the display of a search interface as described. Server 20 and clients 22 may include any one of various types of computer devices, having, e.g., a processing unit, a memory (which may include logic or software for carrying out some or all of the functions described herein), and a communication interface, as well as other conventional computer components (e.g., input device, such as a keyboard/keypad and/or mouse, output device, such as display). For example, client 22 may include a desktop computer, laptop computer, mobile device such as a mobile phone, web-enabled phone, smart phone, television, television set-top box, and the like.

Clients 22 and server 20 may communicate, e.g., using suitable communication interfaces via a network 24, such as the Internet. Clients 22 and server 20 may communicate, in part or in whole, via wireless or hardwired communications, such as Ethernet, IEEE 802.11b wireless, or the like. Additionally, communication between clients 22 and server 20 may include or communicate with various servers such as a mail server, mobile server, media server, and the like.

Server 20 generally includes logic (e.g., http web server logic) or is programmed to format data, accessed from local or remote databases or other sources of data and content, for presentation to users of clients 22, preferably in the format described herein. For example, server 20 may format data and/or access a local or remote database to communicate and cause the display of an interface to clients 22, data related to objects for display within an interface (which may include a search interface and display window for displaying objects, for example), links to additional information and/or content related to the objects, the additional content and/or information itself, and the like.

To this end, server 20 may utilize various web data interface techniques such as Common Gateway Interface (CGI) protocol and associated applications (or "scripts"), Java® "servlets", i.e., Java® applications running on a web server, or the like to present information and receive input from clients 22. The server 20, although described herein in the singular, may actually comprise plural computers, devices, databases, associated backends, and the like, communicating (wired and/or wireless) and cooperating to perform some or all of the functions described herein. Server 20 may further include or communicate with account servers (e.g., email servers), mobile servers, photo servers, video servers, and the like. For example, a displayed tile may be associated with additional content accessible via a server remote to the server associated with the displayed interface.

Further, web pages communicated to client 22 may include various text and media objects such as articles, documents, photos, audio files, video files, and the like. Additionally, the content may include selections or links to further content accessible by the interface and associated user device, e.g., via Application Programming Interfaces (APIs), web pages, and the like stored or accessed locally or remotely. Content accessible by client 22 via a presented web page (within the search result display tiles or accessible via the search result display tiles) may conform to any suitable data format including various media formats such, e.g., still image (e.g., JPEG, TIFF), video (e.g., MPEG, AVI, Flash), or audio (e.g., MP3, OGG).

Additionally, FIG. 1 illustrates an advertisement server 24, which may communicate with server 20, one or more client 22, or combinations thereof. In one example, advertisement server 24 operates to associate advertisements with user-generated actions (e.g., user entered searches or attribute selections). Server 20 may transmit or cause the display of the advertisement data with a displayed interface or web page to client 22, in one example, within a header or footer of the displayed page, and in another example, within a display window of the interface. In other examples, advertisement server 24 may send the advertisement data directly to client device 22 based on information from server 20 (e.g., based on client activity or client id/profile), client 22 (based on an identification of client 22), or the like.

It should be noted that although the exemplary methods and systems described herein describe use of a separate server and database for performing various functions, other embodiments could be implemented by storing the software or programming that operates to cause the described functions on a single device or any combination of multiple devices as a matter of design choice so long as the functionality described herein is performed. Although not depicted in the figures, server 20 generally includes such art recognized components as are ordinarily found in server systems, including but not limited to processors, RAM, ROM, clocks, hardware drivers, associated storage, and the like (see, e.g., FIG. 5, discussed below). Further, the described functions and logic may be included in software, hardware, firmware, or combination thereof.

Figure 2B:
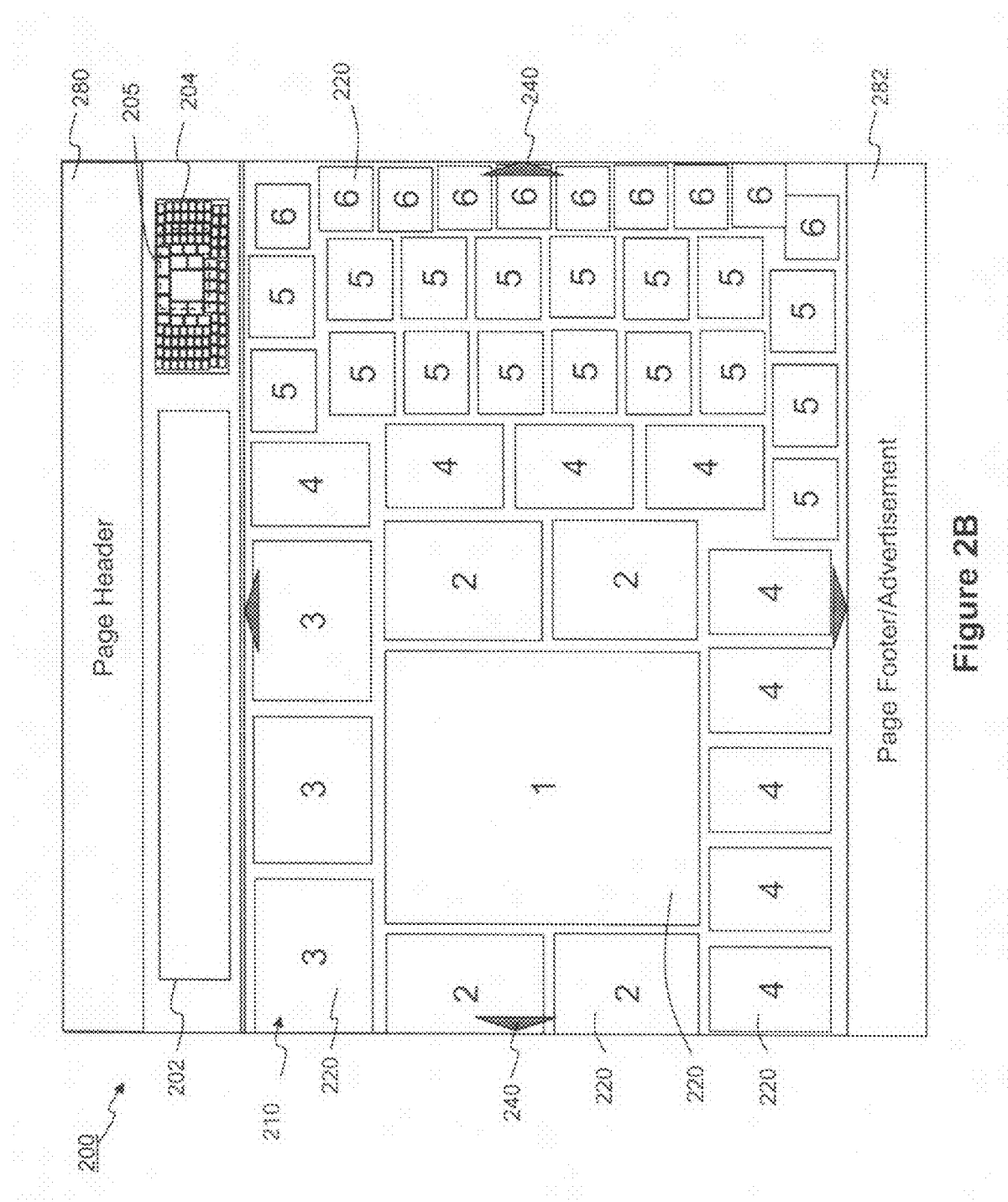

FIGS. 2A and 2B illustrate an exemplary visual search interface 200 for searching and navigating content. In one example, the visual search interface 200 includes filter criteria 202, e.g., a window or element of interface 200, wherein a user may enter search filter criteria, and a display window 210 for visually displaying and allowing navigation of the search results. Additionally, a results map view 204 may be displayed to assist in navigating the search results and visualizing the result set (particularly if large in number).

The search criteria may be entered in a variety of ways, e.g., entering text, selecting attributes from various fields, radio buttons, sliders/scrubbers, drop-down menus, or the like. For example, filter criteria 202 may include a text entry interface for entering search terms. In other examples, filter criteria 202 may include various attributes or ratings, whereby a user may make selections to filter a set of objects. Filter criteria 202 may vary depending on the inventory or set of objects to be searched, e.g., having specific attribute selections related to the objects to be searched. For instance, an automobile search may include selectable attributes such as the style of car, size of the engine, color, make, and so on as well as a text entry window for user entered text searching.

The results of a user entered search are displayed by search result tiles 220 within display window 210 according to the object's match to the selection within filter criteria 202. For example, the objects are ranked by any suitable ranking or scoring technique to determine a top-down relevancy order for the search results based on the filter criteria. At least a portion of the search results are then displayed as search result tiles 220 according to the relevancy order with the best or highest ranked search result tile 220 displayed centered and/or larger than other search results within display window 210. For example, a best match search result shown here as "1," is displayed centered and larger than other displayed results (note, the reference numbers "1", "2", etc., in this example refer to the relative sizes of the tiles corresponding to the search results, but not necessarily the relative rankings of the search results; for example, the four tiles indicated as "2" may have the same or different rankings). Additionally, surrounding search result tiles 220 are displayed in progressively smaller display sizes generally concentrically around the best match. In some examples, the surrounding search results may further be shaded or have a different level of opacity than the centered object, which may vary with distance from the centered object.

In one example, the search result tiles 220 are displayed from the center outward, following a concentric-circle radius pattern based on their match. For example, to the immediate left and right of the "1" search result tile 220, "2" and "3" search result 220 sizes are displayed, followed by search result 220 sizes "4", "5", and "6," becoming smaller with distance from the "1" search result tile 220. In some examples, the search results for a particular display number/size have the same score or ranking based on the search criteria; in other examples, however, the search results for a particular display number/size (e.g., displayed in "2") need not have received the same score. In yet other examples, the relative size of each search result is displayed according to its ranking and score with the potential that all displayed search results are of different sizes. For example, depending on the particular search criteria and set of objects being searched, the ranking may be a continuum from a best match to a worst match. Accordingly, the display of search result tiles around the best match may vary in size accordingly or be stepped as shown.

In one example, each search result tile 220 is displayed as a rectangular shaped tile, but other tile shapes such as circular, oval, irregular shapes, combinations thereof, etc., are possible and contemplated. Additionally, the display of search result tiles 220 may partially overlap other search results, e.g., a higher ranking search result tile partially overlapping a relatively lower ranked search result tile.

In one example, each displayed search result tile 220 includes an image and/or text associated with the object and is selectable by a user to access additional content or information. The additional content or information may be displayed in the viewing space of the particular search result tile 220, in another portion of interface 200, or in a new window. For example, upon hovering and/or clicking a search result tile 220, additional information associated with the object is displayed within the display space of a search result tile 220.

Additionally, the additional information may further provide access or a link to the additional information, which may open or launch a new window or application to access the additional information.

In one example, search result tiles 220 have three exemplary presentation states: 1) available; 2) at-state; and 3) expanded state. The at-state may include an image and/or text of the search result, and the available state may include an altered image and/or text of the object, e.g., made opaque relative to the at-state of the image. Rolling or hovering over an available state display (e.g., via mouse or keyboard command) switches the display of the search result object to the at-state (and in one example, switches a previous display from the at-state to the available state). In one example, the at-state is visually differentiated from the available state, however the size, shape and placement may be identical to that of the available state.

Further, hovering over the at-state display for a predetermined amount of time, e.g., for two seconds, or selecting the at-state (e.g., by clicking thereon), switches the display to the expanded state. In one example, the expanded state enlarges the selected search result tile to display additional information. For example, the additional information may include a larger or additional image or content, additional text, ability to close the expanded state, links to view additional information or content, compare to other objects, view popularity index, and the like. The expanded state may shift the presentation so as to make the entirety of the expanded state visible. The expanded state may be identical in size and structure for every search result object, regardless of size of the search result in display window 210.

It will be recognized that additional display states may be used and some display states described may be omitted; for example, an interface may merely display an at-state and expanded state, or an available state and expanded state. Further, other display states or animations may be used and associated with each displayed search result 220. Accordingly, an interface may vary the number of display states depending, e.g., on user preferences/selections, device capabilities, and the like.

As described, search result tiles 220 may be associated with different types of content such as articles, photos, videos, audio files, advertisements, combinations thereof, and any other content suitably displayed or accessed via a webpage. The initial display state and active display states of search result tiles 220, as well as the information or content associated therewith, may vary for each type of content.

In one example, the display of search result tiles 220 shown in display window 210 are navigated by positioning a pointer (e.g., an arrow, hand, or other graphic associated with a user device) over a desired search result tile 220 and selecting, e.g., by clicking a mouse. It will be recognized that other methods, e.g., via keystrokes or other suitable input devices, may be used to highlight or select one of the displayed search result tiles 220. A user may therefore engage and select different displayed search result tiles 220 to view previews and content associated therewith.

Display window 210 may be navigated in a variety of ways. In one example, a user utilizes global map position window 204 to determine which portion of the search results are displayed as indicated by the outline 205 displayed therewith. For example, a user may use a mouse, keystrokes, or other input methods to move the outline 205 within global map position window 204 to display different portions of the search results in display window 210. Further, in one example, display window 210 may include navigation arrows 240, which may be selected by a pointer, to move in the direction indicated; for example, clicking on the far right navigation arrow 240 moves the map in to the right within the global map of search results. Other methods for re-centering or moving within the search results are possible and contemplated, including, clicking and dragging with a mouse, key strokes, and the like.

It will be recognized that a server system may store and cause the display of the described interface, filter criteria, and search results in a variety of fashions using well known methods and systems. For example, a server system and/or associated database may store or access necessary data and files for causing the display of each of the described search results and associated information. A set of search result tiles (with or without accompanying additional information) may be communicated to a user in response to entered filter criteria. Further, the server may store or access the content for generating the search result tiles, additional information as well as any desired applications/scripts (which could be downloaded to the client) for causing described functions or effects, if included.

In one example, interface 200, whether as a stand alone interface or an element of a larger interface or web browser page, may be accessible by a user via an online account such as an email account. For example, a user may login to an account server, and interface 200 may be included in a "home" page or otherwise displayed in response to a user login. In such an example (as well as other examples), interface 200 may be customizable, e.g., in terms of the appearance of the array of the search criteria entry pane 202, the global map navigation 204, map display window 210, and so on. Further, interface 200 or portions thereof may include or be part of one or more widgets. In these and other fashions, an individual user may access interface 200 from multiple client devices; for example, interface 200 may be served from a computer server to a user accessing the server from various devices such as a personal computer, work computer, mobile computer device such as a phone, and the like. In other examples, of course, interface 200 may be included as an application program running on a computer device. Furthermore, interface 200 may further include, or be associated with, various other elements such as a page header 280, page footer/advertisement 282, and the like.

Figure 3A:
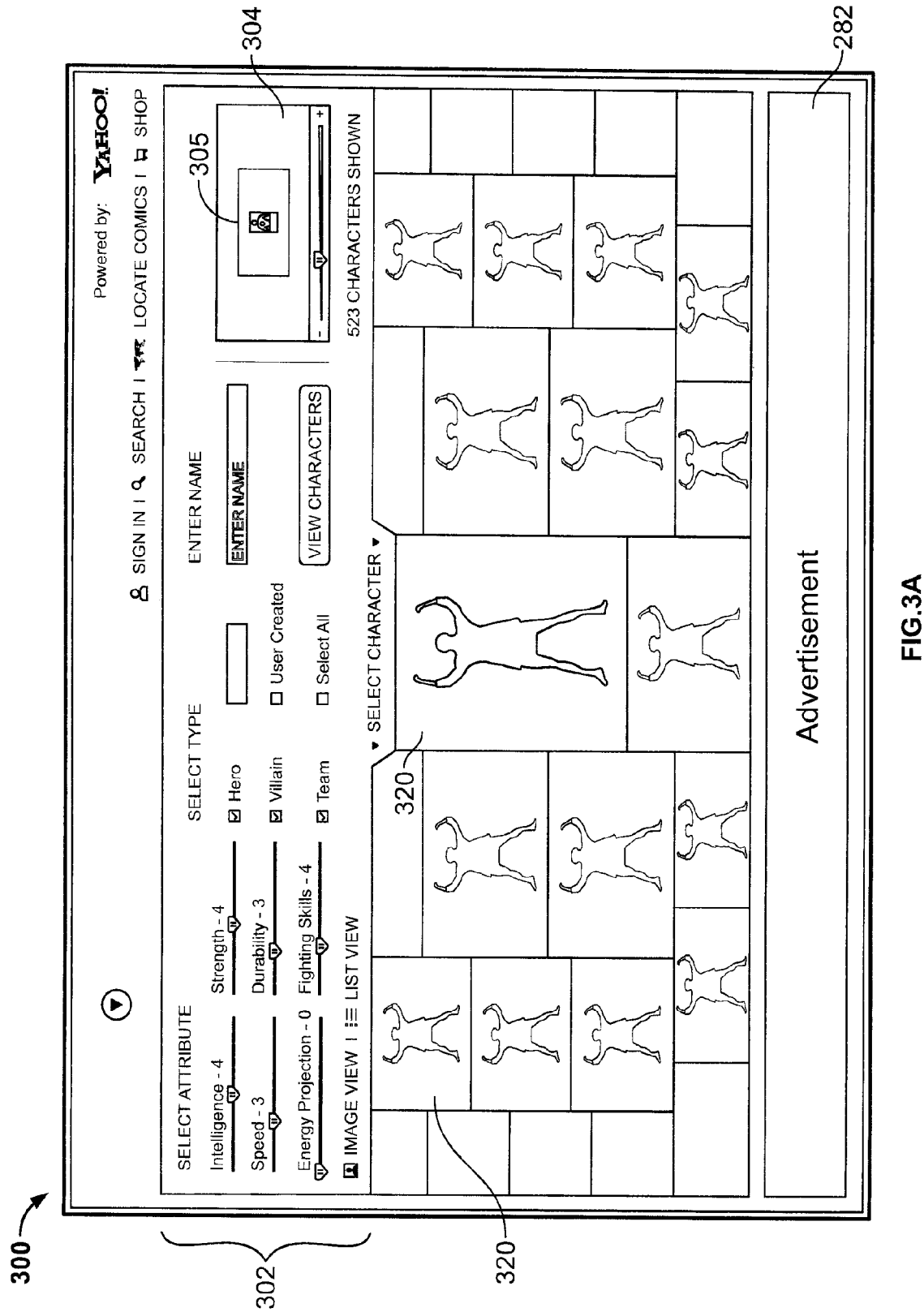
Figure 3B:
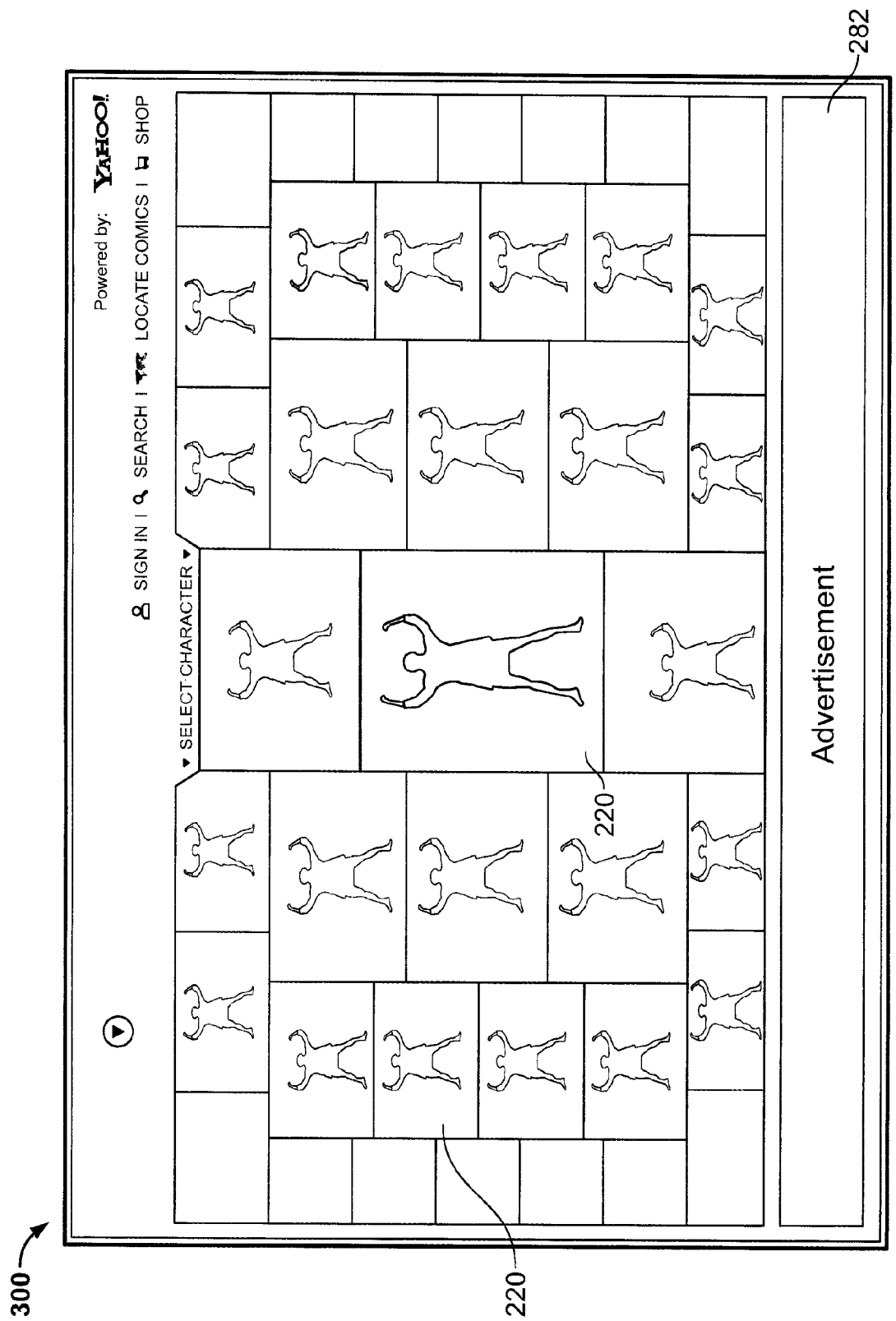
Figure 3C:
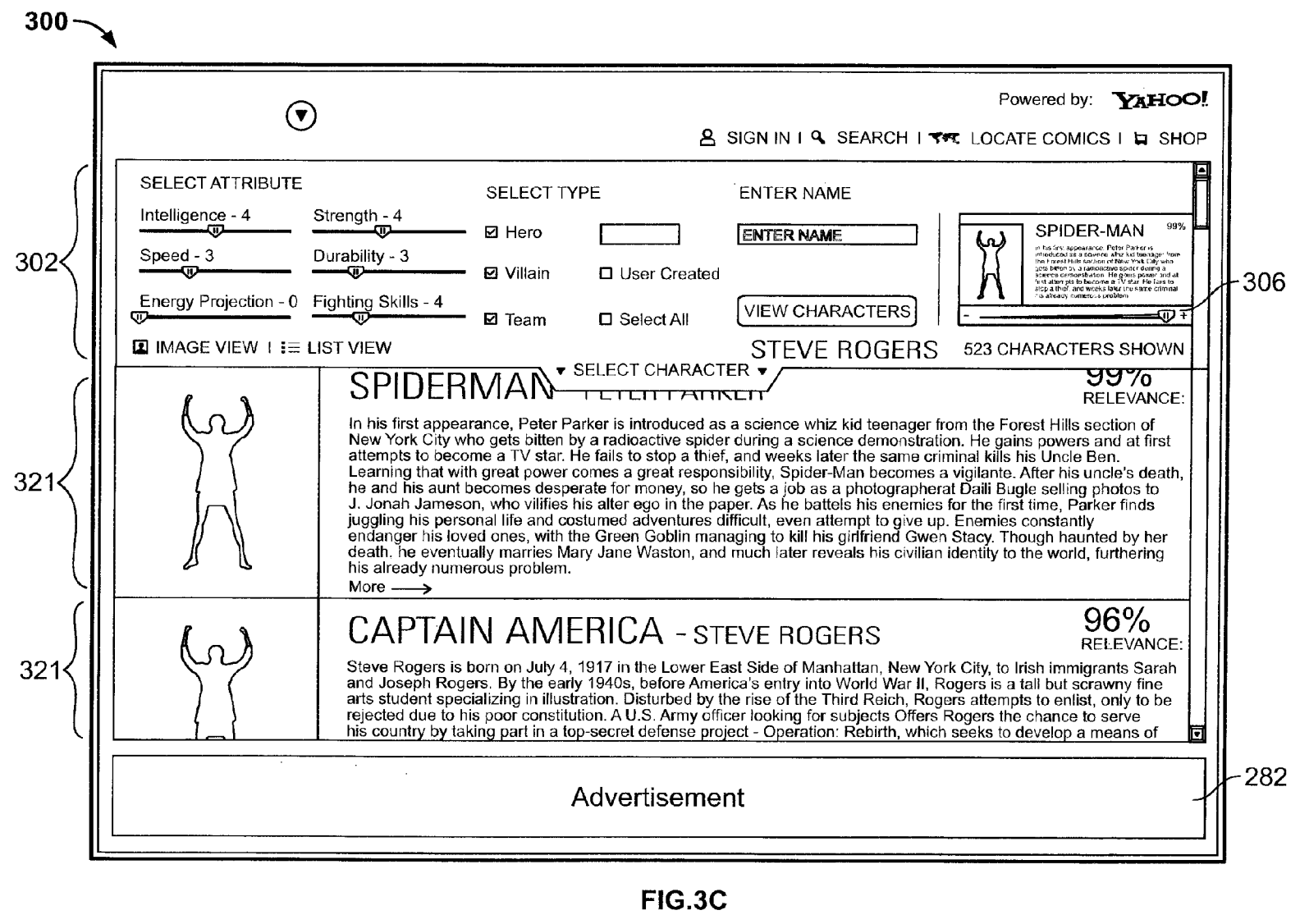

FIGS. 3A-3C illustrate an exemplary interface 300 for searching and navigating objects according to a set of selectable attributes. In this particular example, the objects relating to characters such as comic book characters, video game characters, and the like. Similar to interface 200, interface 300 includes filter criteria 302 for selecting search filter criteria, which is part of a drop down menu or tray located above display window 310.

In this example, the filter criteria 302 include options for selecting an attribute and a type of object (in this instance a character attribute and character type). For instance, characters within a set of characters may be rated or associated with various attributes such as intelligence, speed, energy, strength, durability, fighting skills, and so on. In this example, the ratings are numerical, from 0 to 7, with 0 being the lowest (or not available), and 7 being the highest possible. Users may use the attribute "scrubber" to adjust each attribute from 0 to 7 within the filter criteria 302. Of course, in other examples, a user may select attributes in various other ways including typing in attributes, selecting radio buttons, and so on. Additionally, in this example, each attribute filter may be turned on or off. When turned on, each filter may return only those characters with an exact rating match (e.g. if intelligence=4 than only characters with intelligence=4 will be considered and displayed). In other examples when turned on, each criteria filter may return only those search results, in this instance characters, that equal or exceed the rating match.

In one example, the objects or characters may be categorized or grouped into various types of characters. For example, characters may be typed according to the criteria such as hero, villain, user-generated, and so on. A character may be tagged to all criteria types or to none of them. In this example, checking an individual criterion will create an "and" search from the character inventory. Checking "Select All" will check all boxes and display all characters in the inventory according to the attributes selected and possibly name entered. Checking "Select All" a second time will uncheck all Select Type check boxes, including the Select All check box.

Filter criteria 302 further includes a text box for inputting a character name, which may include an auto-complete feature populated, e.g., with available characters and popular nicknames. Additionally, a text box included with filter criteria 302 for inputting search terms may also be included (which can be matched to search results based on tags, additional information regarding the search results, or the like).

Filter criteria 302 further includes a "View Characters" button that is clicked to display the characters according to the selected filter criteria and/or to refresh the displayed characters. In other examples, the displayed characters may be updated in real-time as a user selects various attributes, types, and so on.

The filter criteria 302 may be opened and closed by selecting the tab "Select Character." The tab allows the filter criteria 302 to be open or closed (hidden from view). Initial rendering of interface 300 may default to the filter criteria 302 open, and subsequent renderings default with the filter criteria 302 closed.

User interface 300 further includes a map view 304 that controls the presentation of the results set in display window 310. The outline 305 corresponds to the presentation of information in the results displayed in display window 310. In one example, outline 305 remains in a fixed position, while the background is clickable and draggable by a user. When a position of the map view 304 is selected (e.g., clicked on) outside of the outline 305, the selected position is centered within outline 305 and the displayed search results set shifts correspondingly for display with display window 310. When the mouse button is clicked and held, a user may drag the results set within map view 304 across the outline 305, effectively changing the results set displayed in display window 310 in real time. Additionally, a zoom scrubber 306 may be included allowing more or fewer results to be viewed in the map view 304 and/or in the results set in display window 310. Scrubber 306 may default to the middle of the presentation options. Sufficiently small results sets (around 20 or fewer search results, for example) may not benefit from scrubber 306 because all results will be displayed within rectangle 304 and/or display window 310, however, scrubber 306 may still function.

Character tiles 320 are displayed in display window 310 according to the filter criteria from the center outward, following a concentric-circle radius pattern based on an algorithm. In one example, a popularity algorithm is used, determined based on search, buzz, user activity, and user-generated tagging (of course any scoring or ranking mechanism may be used). In one example, display window 310 defaults to the most popular character centered, in the at-state (e.g., highlighted).

Character tiles 320 generally cascade in size from largest being most popular, to smallest being least popular. In one example, a dynamic sizing ratio may calculate dimensions based on area, the display of search results may be portrait or landscape, and the search results scaling down so that the smallest, least popular search results in the results set at 0.15 of the largest, most popular search result, thereby creating a visual sizing relationship wherein the higher ranked/scored characters are larger and more "central" than others.

In instances where the search results exceed the space available within display window 310 based on the display size of the objects 320, map view 304 may be used to pan and or zoom to view the objects. Additionally, navigation arrows (e.g., arrows 240 of FIGS. 2A and 2B) may be included.

In one example, the search results may have three presentation states: 1) available; 2) at-state; and 3) expanded state. In one example, at-state may include an image of the character, the available state may include an altered image of the character, e.g., made opaque relative to the at-state of the image. Rolling or hovering over an available state display (e.g., via mouse or keyboard command) switches the display of the character to the at-state (and in one example, switches a previous display from the at-state to the available state). In one example, the at-state is visually differentiated from the available state, however the size, shape and placement is identical to that of the available state.

Further, hovering over the at-state display for a predetermined amount of time, e.g., for two seconds, or selecting the at-state (e.g., by clicking thereon), switches the display to the expanded state. In one example, the expanded state enlarges the selected character tile to display additional information. For example, the additional information may include a larger or additional image, character name, ability to close expanded state, links to view character details, compare to other characters, see complete character's lineage, view popularity index, and the like. The expanded state may shift the presentation so as to make the entirety of the expanded state visible. The expanded state may be identical in size and structure for every character, regardless of size of the character size in display window 310.

FIG. 3C illustrates an exemplary "List View" of interface 300. The display of interface 300 is similar to the interface of FIG. 3B, however, instead of images of the characters displayed in display window 310 in a centralized fashion, the results 321 are ordered in a list. The results may be displayed with varying amounts of information, e.g., shown including a title, image, text, and link to "more" information. A user may scroll down to view lower ranked results. In other examples, a user may move scrubber 306 to the left and "zoom" out such that fewer details are shown in the list, e.g., merely a title, with additional results displayed within a given size display window.

In yet other examples, character names may be used within the same or similarly shaped tiles as shown in FIGS. 3A and 3B. For instance, the logic for displaying and sizing the search results may be the same or similar as that for FIG. 3B, the search results displaying text associated with the result. The result may create a "tag cloud" size dimension attribution, where the larger the shape, the larger the character name text, and visa versa.

Figure 4:
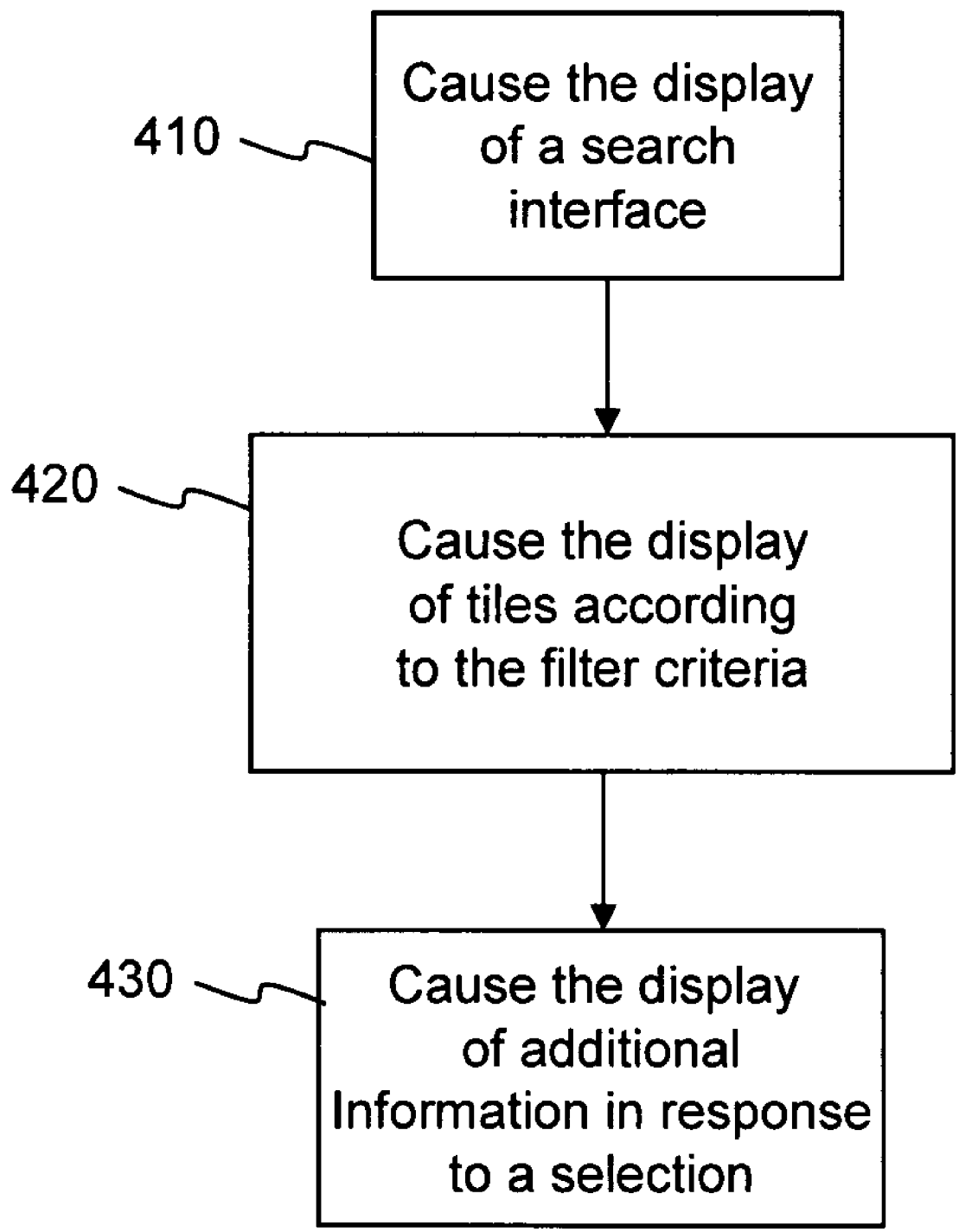
FIG. 4 illustrates an exemplary method for displaying and navigating search results.

FIG. 4 illustrates an exemplary method for causing the display of an interface for searching and navigating content. The method may be carried out, at least in part, by a server device (e.g., a web server) via a presented web page to a client device. Initially, the method includes causing the display of an interface window at 410, the interface window including a search criteria filter portion in which a user may enter or select filter criteria for filtering a set of objects, wherein the filtered objects are displayed in a display window as a set of tiles. The criteria filter portion and display window may be displayed as described herein, and may be included within a served web page that may contain other features such as a page header, advertisement information, and the like. Further, the arrangement of the filter criteria portion and display window may be controlled by the server or client device.

The method further includes causing the display of the objects or search results at 420 (e.g., within a display window of the interface) according to entered filter criteria. In one example, the objects are ranked or scored based on filter criteria with the highest ranked object centered in the display with at least a portion of the remaining objects positioned around the highest ranked object. Further, other characteristics of the displayed objects, such as the size, shape, color, opacity, etc., may vary with the respective ranking. Further, the display of the objects at 420 may be navigated in a map-type application, e.g., moving in various directions to view objects, as described with respect to FIGS. 2A, 2B, and 3A-3C.

The displayed objects may further be selectable by a user to display additional information associated with the object. Accordingly, the method further includes causing the display of additional information at 430, e.g., in response to a user selection of the object. A user selection may take various forms including hovering a cursor over the object, clicking on an object, and so on (and different information may be displayed in response to hovering versus clicking on an object). The method may include causing a new window or application to be opened in response to a user selection of the object. Further, selecting an object may display additional information including a link to additional content, which may be opened in a new window containing the additional content. Additionally, a selection may cause the client device to launch an application program such as a media player to display an audio or video file associated with the object. In other examples, the browser page may link to the additional information of the display.

Figure 5:
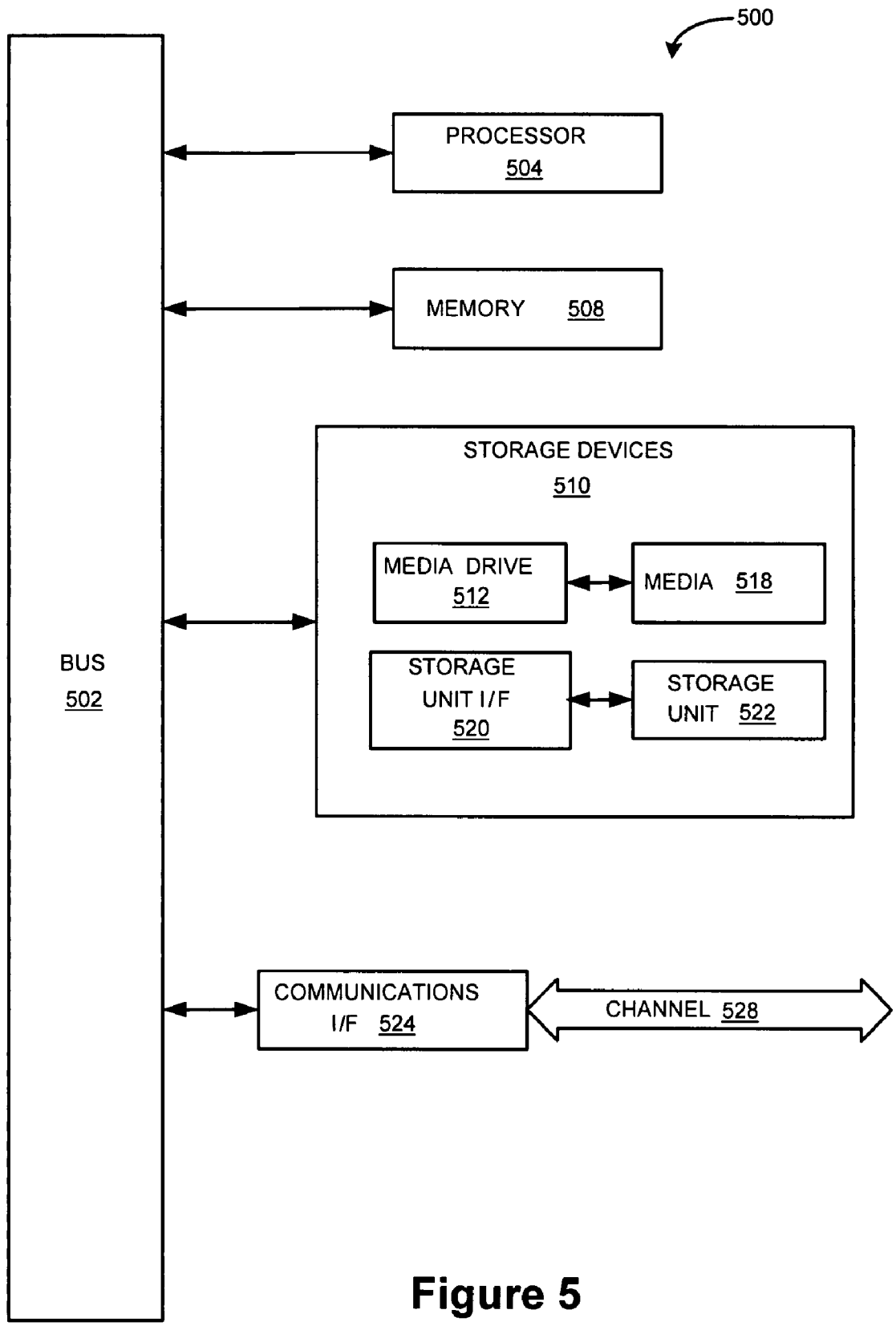
FIG. 5 illustrates an exemplary computing system that may be employed to implement processing functionality for various aspects of the invention.

FIG. 5 illustrates an exemplary computing system 500 that may be employed to implement processing functionality for various aspects of the invention (e.g., as a server device or system, a client device, mobile device, memory device, and so on). Those skilled in the relevant art will also recognize how to implement the invention using other computer systems or architectures. Computing system 500 may represent, for example, a desktop, mainframe, server, memory device, mobile client device, or any other type of special or general purpose computing device as may be desirable or appropriate for a given application or environment. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communication medium.

Computing system 500 can also include a main memory 508, for example random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory ("ROM") or other static storage device coupled to bus 502 for storing static information and instructions for processor 504.

The computing system 500 may also include information storage mechanism 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 518 may include, for example, a hard disk, floppy disk, magnetic tape, optical disk, CD or DVD, or other fixed or removable medium that is read by and written to by media drive 514. As these examples illustrate, the storage media 518 may include a computer-readable storage medium having stored therein particular computer software or data.

In alternative embodiments, information storage mechanism 510 may include other similar instrumentalities for allowing computer programs or other instructions or data to be loaded into computing system 500. Such instrumentalities may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a USB port), a PCMCIA slot and card, etc. Software and data transferred via communications interface 524 are in the form of signals which can be electronic, electromagnetic, optical, or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 508, storage device 518, or storage unit 522. These and other forms of computer-readable media may be involved in providing one or more sequences of one or more instructions to processor 504 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into computing system 500 using, for example, removable storage drive 514, drive 512 or communications interface 524. The control logic (in this example, software instructions or computer program code), when executed by the processor 504, causes the processor 504 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A computer-readable storage medium for tangibly storing thereon computer readable instructions comprising instructions for:
   causing the display of an interface for displaying search results, the interface comprising:
      a field for entering filter criteria for searching a set of objects; and
      a display window for displaying tiles associated with at least a portion of the set of objects according to the filter criteria,
         such that a tile associated with an object having the best match to the filter criteria is displayed centrally relative to other displayed tiles within the display window, and
         such that where the tiles exceed the space available within the display window based on a display size of each of the tiles, the display window is operable to pan to display different tiles and is further operable to zoom out to display additional tiles; and
      a global map position window operable for displaying which tiles associated with the set of objects are displayed in the display window, such that the global map position window is further operable for displaying a relative position of the displayed tiles to additional tiles associated with the set of objects.

2. The computer-readable storage medium of claim 1, wherein the best match is determined from a popularity search algorithm.

3. The computer-readable storage medium of claim 1, wherein the filter criteria comprises at least one selectable attribute, wherein the at least one selectable attribute relate to objects to be searched.

4. The computer-readable storage medium of claim 1, wherein the other displayed tiles are displayed concentrically around the best match according to their respective fit to the filter criteria.

5. The computer-readable storage medium of claim 1, wherein the tile associated with the best match is displayed larger than the other displayed tiles.

6. The computer-readable storage medium of claim 1, wherein the displayed tiles are selectable to access additional information, wherein the selection of a displayed tile launches an application program to display an audio or video file associated with the object.

7. The computer-readable storage medium of claim 1, wherein the global map position window controls the presentation of the set of objects in the display window.

8. The computer-readable storage medium of claim 1, wherein the display window further comprises navigation arrows operable for changing the display of search results in the display window.

9. A computing device comprising:
a processor;
a storage medium for tangibly storing thereon program logic for execution by the processor, the program logic comprising:
receiving logic executed by the processor for receiving filter criteria for filtering a set of objects;
display logic executed by the processor for causing a display of a plurality of tiles associated with the set of objects, the tiles displayed based on a ranking of at least a portion of the set of objects according to the filter criteria,
such that a tile associated with the highest ranking object is displayed centrally relative to other displayed tiles, and
such that where the tiles exceed the space available within the display window based on a display size of each of the tiles, the display window is operable to pan to display different tiles and is further operable to zoom out to display additional tiles; and
global map logic executed by the processor for causing a display of a global map position window operable for displaying which tiles associated with the set of objects are displayed in the display window, such that the global map position window is further operable for displaying a relative position of the displayed tiles to additional tiles associated with the set of objects.

10. The computing device of claim 9, further comprising ranking logic executed by the processor for determining a ranking of at least a portion of the set of objects based on the filter criteria.

11. The computing device of claim 9, wherein the other displayed tiles are displayed concentrically around the best match according to their respective fit to the filter criteria.

12. The computing device of claim 9, wherein the tile associated with the best match is displayed larger than the other displayed tiles.

13. The computing device of claim 9, wherein the global map position window controls the presentation of the set of objects in the display window.

14. The computing device of claim 9, wherein the display window further comprises navigation arrows operable for changing the display of search results in the display window.

15. A method comprising:
receiving filter criteria for searching a set of objects;
ranking, by a computer processor, at least a portion of the set of objects based on the filter criteria; and
causing the display of tiles associated with the set of objects on a display window based on the ranking, such that a tile associated with the highest ranked object is centered relative to other displayed tiles, and such that where the tiles exceed the space available within the display window based on a display size of each of the tiles, the display window is operable to pan to display different tiles and is further operable to zoom out to display additional tiles; and
causing the display of a global map position window operable for displaying which tiles associated with the set of objects are displayed in the display window, such that the global map position window is further operable for displaying a relative position of the displayed tiles to additional tiles associated with the set of objects.

16. The method of claim 15, wherein the filter criteria comprises at least one selectable attribute, where in the at least one selectable attribute relate to objects to be searched.

17. The method of claim 15, further comprising displaying the other displayed tiles concentrically around the best match according to their respective fit to the filter criteria.

18. The method of claim 15, further comprising displaying the tile associated with the best match larger than the other displayed tiles.

19. The method of claim 15, further comprising a map view for navigating the set of objects wherein the map view controls the presentation of the objects in the display window.

20. The method of claim 15, wherein the display window further comprises navigation arrows operable for changing the display of search results in the display window.

* * * * *